Oct. 24, 1933.  W. E. REED  1,932,119
APPARATUS FOR ELECTRIC WELDING
Filed Dec. 3, 1928
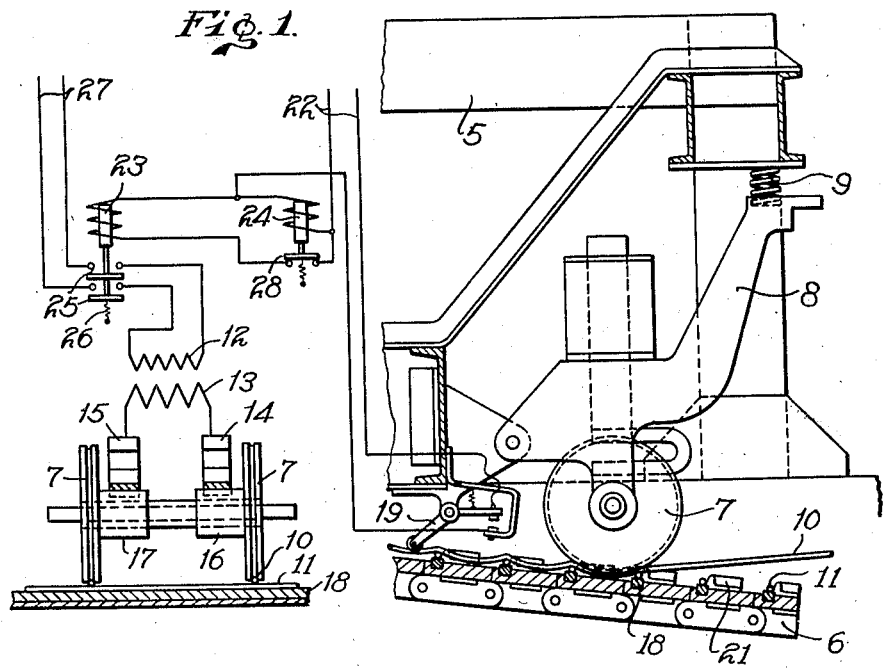
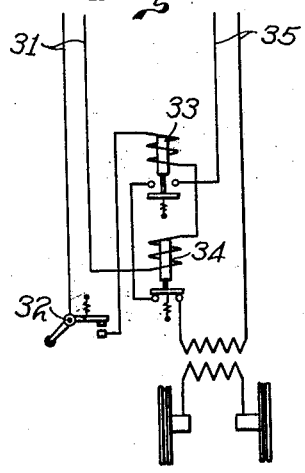
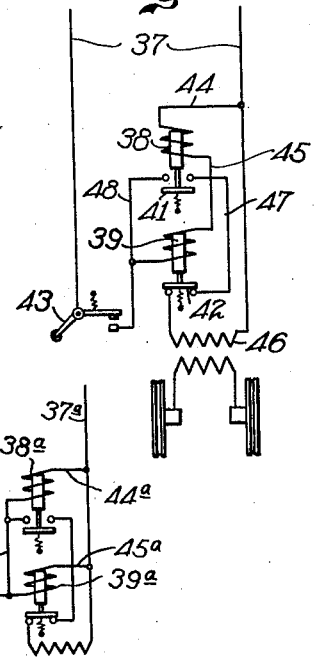
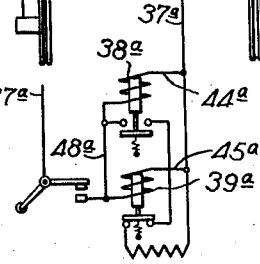
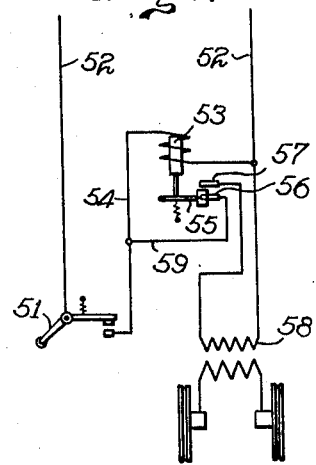
INVENTOR
William Edgar Reed,
By Archworth Martin,
Attorney.

Patented Oct. 24, 1933

1,932,119

UNITED STATES PATENT OFFICE 1,932,119

APPARATUS FOR ELECTRIC WELDING

William Edgar Reed, Pittsburgh, Pa.

Application December 3, 1928. Serial No. 323,540

13 Claims. (Cl. 219—4)

My invention relates to a method of and apparatus for making welds electrically, and is hereinafter described as employed in the welding together of wires or rods, but it may be used in various other ways.

This invention constitutes in part a continuation of my copending application issued December 4, 1928, as Patent No. 1,694,081.

One object of my invention is to provide a method for more effectively controlling the duration of the application of welding current than is possible in the case of various systems heretofore employed.

Another object of my invention is to limit the period of application of welding current to an extent not possible through the employment of a single controlling device such as a relay.

Another object of my invention is to simplify and improve generally upon devices of the character referred to.

In the practice of my invention as hereinafter explained, I limit or control the duration of the flow of welding current in various ways. One manner of effecting this control is through the employment of two relays, one of which will effect closure of the welding circuit and the other of which will break the same. These means may be energized simultaneously, and the closing means operate slightly quicker than the interrupting means, or a single control means may be employed, such as a relay which operates a switch member, the switch member during one portion of its movement effecting a closure of the welding circuit and continued movement thereof resulting in interruption of such circuit.

Where two relays or electromagnets are employed, they can be so constructed that one will operate at a desired greater speed than the other. This operation may be effected in any manner well-known in the relay used, as for instance by having a fewer number of turns of coarse wire in the faster-acting magnet, and a greater number of turns of finer wire in the relay which is to be operated more slowly. The desired difference in speed of operation could also be effected by variation of magnetic circuits or of air gaps as between the core and the armature of the relay.

Some of the ways by which the invention may be practiced are shown in the accompanying drawing, wherein Figure 1 is a partially diagrammatic view showing one manner in which the flow of welding current may be controlled, and also showing in side and end elevation a portion of the welding mechanism with which the electrical circuits are associated; Fig. 2 shows a modification of the wiring diagram of Fig. 1; Fig. 3 shows still another modification thereof, but utilizing the welding circuit as a source of energy for the relays; Fig. 4 shows a modification of the device of Fig. 3, and Fig. 5 is a further modification of the structure of Fig. 3.

Since the present application is directed primarily to the manner in which current is supplied to welding electrodes, rather than to the welding machine as such, only so much of the machine is shown as is required to an understanding of the invention, the complete machine being disclosed in my said Patent No. 1,694,081.

The framework of the welding machine is indicated by the numeral 5, and a conveyer 6 serves to carry the wires or rods to be operated upon past roller electrodes 7 which are mounted in a rocking frame 8 that is supported by the framework and which is yieldably held in close engagement with the conveyer and the material being operated upon by a spring 9.

The conveyer 6 serves to advance strand wires 10 and stay wires 11 beneath the roller electrodes 7, and as the wires 11 pass beneath such electrodes, welding current is supplied to the electrodes to weld the strand wires and the stay wires.

The welding current is supplied from a transformer having a primary winding 12 and a secondary winding 13, through brushes 14 and 15 that engage hubs 16 and 17, respectively, of the roller electrodes, and thus through the electrodes and the wires, and also through electrode bars 18 that are carried by the conveyer, as more fully set forth in my patent above referred to.

While, as shown in said patent, a switch for controlling the supply of welding current may be actuated by movement of the rocking frame 8, I herein show a switch 19 that is actuated by means of blocks 21 which are mounted on the conveyer and which may also serve as seats for the stay wires 11, if desired.

As these blocks move beneath the switch arm 19, they effect closure of a control circuit 22, and the switch 19 is so positioned that this closure will be effected at approximately the instant that a wire 11 reaches welding position beneath the roller electrodes.

Upon closure of the auxiliary circuit 22, current will flow through the coils of relays or electro-magnets 23 and 24. The magnet 23 will thereupon be energized to effect closure of a switch 25 against the tension of a spring 26, thus completing a welding circuit 27 through the primary coil 12 of the transformer.

Simultaneously, energy is being built up in the magnet 24, to effect opening movement of a switch 28, to thereby break the energizing circuit of the magnet 23, and therefore the primary switch 25 will be drawn to open position by its spring 26, thus breaking the welding circuit. Further movement of the conveyer 6 permits the operation of the switch 19 to open the control circuit 22, thereby opening the energizing circuit of the magnet 24, and ready for automatically repeating the welding operation.

The relative speeds of operation of the magnets 23 and 24 can be controlled as above-explained, by either design or adjustment, so that the welding current will be supplied for only the exact period of time required to effect a proper weld. The period of application of the welding current is extremely important and will depend upon the thickness or gage of the material being welded, and also upon the strength of the welding current. If current is supplied to a weld for a greater period of time than required, there will be a defective joint.

Another advantage which I secure by the arrangement just described arises from the fact that even should the conveyer 6 be stopped at a point which causes the switch 19 to remain closed, the welding circuit would nevertheless be broken, since a continuous flow of current through the coil of the magnet 24 would result in such magnet remaining energized, and the magnet 23 therefore remains de-energized, permitting the switch 25 to be held open by its spring. Since the magnets 23 and 24 are energized at the same instant, the duration of application of the welding current is dependent upon the degree of speed of operation of the magnet 24, relative to the magnet 23, that is to the difference in time required for these two magnets to operate which is much less than the time required for one to operate.

*For example*

|  | Secs. assumed |
|---|---|
| Time required to open 24 | .3 |
| Time required to open 23 thereafter | .15 |
| Total time to open | .45 |
| Time to close 23 | .30 |
| Time of application welding current | .15 |

In Fig. 2, I show an arrangement wherein a control circuit 31 is opened and closed through movement of a carrier past a switch 32, as in the case of the switch 19 and circuit 22 of Fig. 1. Two electro-magnets 33 and 34 are provided in the circuit 31, the magnet 34 being slightly slower in operation than the magnet 33. Upon closure of the circuit 31, the magnet 33 is energized to close the welding circuit 35, while the magnet 34 is being energized to break the welding circuit. The difference in time of actuation of the two relays relative to one another determines the period of application of the welding current, as in the case of Fig. 1. Thus, for example, if the magnet 33 operates in .20 seconds, for instance, and the magnet 34 operates in .30 seconds, the welding current will be supplied for a period of .10 seconds.

Referring to Fig. 3, I show a method of control wherein there is no control circuit independent of the welding circuit, but in which the control is effected through a circuit that is auxiliary to the main or welding circuit. In this arrangement, the welding circuit 37 is controlled by electro-magnets 38 and 39 that operate through switches 41 and 42 respectively. Upon closure of a switch 43, a circuit is established from one side of the line 37 through a conductor 44, magnet coil 38, conductor 45, the coil 39, and through the contacts of the switch 43, to the other side of the line 37. The coil 38 acts more quickly than the coil 39 and closes the switch 41, thus completing a circuit through the transformer 46, switch 42, conductor 47, switch 41, and a conductor 48.

The slower-acting coil 39 will thereupon open the switch 42, thus interrupting the flow of current through the transformer. The switch 42 will remain open and the switch 41 closed, so long thereafter as the switch 43 remains closed, so that there can be no flow of current through the transformer until after the various switches are restored to their normal positions as shown in Fig. 3, and the switch 43 is again closed.

The arrangement shown in Fig. 4 is similar to that shown in Fig. 3, in so far as the control or auxiliary circuit is supplied with current directly from the main circuit. In this arrangement, a switch 51 controls flow of current from one side of a line 52 to the other side thereof. Upon closure of the switch 51, current will flow through an electro-magnet coil 53, and a conductor 54, whereupon a movable switch contact member 55 will be caused to move across stationary contact members 56 and 57. The contact member 55 is wide enough to bridge the stationary contact members 56 and 57, thus completing a circuit from one side of the line 52, through the transformer 58, contact members 57 and 56, a conductor 59 and the switch 51, to the other side of the line 52. As the movement of the switch 55 continues, it will pass out of engagement with the contact member 56, thus breaking the welding circuit thus described. Upon opening of the switch 51, the switch 55 will return to the position shown in the drawing, and no current will flow through the transformer during such return movement because of the switch 51 being open.

Referring to Fig. 5, I show a modification which is applicable to either the diagram of Fig. 2 or that of Fig. 3. In this modification, the coils 38a and 39a are shown in parallel instead of in series, so that current which flows through one of these coils will not have to flow through the other one. This feature may be of advantage particularly where it is desired to utilize one coil which will act more quickly than the other coil, since the action of the current in one coil can be controlled independently of the current in the other coil.

In this diagram, the coils 38a and 39a correspond to the coils 38 and 39 of Fig. 3, the coil 38a being connected from one side of the line 37a through 44a to 48a and to the other side of the line 37a. The coil 39a is connected across the line 37a by means of the conductor 45a and the switch.

I claim as my invention:—

1. Means for supplying electric current to welding electrodes, which comprises an electro-magnet for completing the welding circuit, a slower-acting second electro-magnet arranged to break the circuit, and means for supplying energizing current to said magnets simultaneously.

2. Means for supplying electric current to welding electrodes, which comprises an electro-magnet for completing the welding circuit, a second electro-magnet arranged to break the circuit, and means for partially energizing the said second magnet before completion of said circuit.

3. Electric welding apparatus including an electrode, means for supplying current thereto comprising a control device, means controlled by movement of the work for energizing said device, means operated by said device for making the welding circuit and a second means operated thereby for thereafter breaking the said circuit, the two operating forces being simultaneously initiated.

4. Electric welding apparatus comprising a movable electrode, a magnetically-actuated device for completing the welding circuit through the electrode, a slower-acting magnetically-actuated device for interrupting said circuit, and means controlled by movement of the electrode for effecting energization of said devices simultaneously.

5. Electric welding apparatus comprising an electrode, a magnetically-actuated device for completing the welding circuit through the electrode, a magnetically-actuated device for interrupting said circuit, and means for simultaneously energizing said devices, but for causing them to operate at predetermined intervals.

6. Electric welding apparatus comprising a movable welding electrode, and magnetically-actuated means controlled by movement of the electrode for first closing a welding circuit through the electrode and for thereafter interrupting said circuit independently of movement of the electrode.

7. Electric welding apparatus comprising a movable welding electrode, a control circuit closed by movement of the electrode, a magnetic device in said circuit for effecting closure of the welding circuit, and a second device in said control circuit for interrupting the welding circuit, the said second device being slower in operation than the first-named device.

8. Electric welding apparatus comprising a pair of relatively movable electrodes, a control circuit, means actuated through movement of material between the electrodes for closing the control circuit, and means in the control circuit for effecting closing and opening of the welding circuit.

9. Electric welding apparatus comprising a pair of relatively movable electrodes, a control circuit, means actuated through movement of one of the electrodes for closing and opening the control circuit, and a plurality of magnetic means in the control circuit for effecting closing and for opening of the welding circuit within a period less than the time required for one magnet to operate.

10. The combination with an electrical circuit, of a control system therefor comprising a switch device, a magnet for operating said device to close the circuit, a slower-acting magnet for interrupting the circuit closed by the first-named magnet, and means for simultaneously energizing the said magnets.

11. The combination with a welding circuit having a primary transformer winding, of a shunt circuit connected across the welding circuit, a switch controlling the shunt circuit, a magnet coil in the shunt circuit, a switch operated by said magnet to complete the circuit through the primary winding, a slower-acting magnet coil in said shunt circuit, and a switch operated by said magnet to interrupt the circuit through the transformer.

12. The combination with an electric circuit, of an electro-responsive device for closing said circuit, a slower-acting electro-responsive device for breaking said circuit, and means for simultaneously energizing the said devices.

13. The combination with a primary circuit, of a secondary circuit, an electro-responsive device actuated by current flow in the secondary circuit, for controlling the primary circuit, an electro-responsive device for controlling the secondary circuit, one of said devices being more slowly operative than the other, and means for simultaneously energizing the said devices.

WILLIAM EDGAR REED.